United States Patent [19]

Wermeister et al.

[11] 4,335,983
[45] Jun. 22, 1982

[54] CUTTER HEAD FOR HIGH-SPEED MILLING

[75] Inventors: Günter Wermeister, Ratingen; Bernhard Bellmann, Pfungstadt, both of Fed. Rep. of Germany

[73] Assignee: Sandvik GmbH, Düsseldorf, Fed. Rep. of Germany

[21] Appl. No.: 210,568

[22] Filed: Nov. 26, 1980

[30] Foreign Application Priority Data

Dec. 3, 1979 [DE] Fed. Rep. of Germany ....... 2948544

[51] Int. Cl.³ ............................................. B26D 1/12
[52] U.S. Cl. ...................................... 407/41; 407/46; 407/61
[58] Field of Search .................. 407/40, 41, 42, 46, 407/47, 49, 51, 61, 62

[56] References Cited

U.S. PATENT DOCUMENTS

| 2,155,595 | 4/1939 | Harten | 407/41 |
| 2,538,909 | 1/1951 | Miller | 407/41 |
| 2,645,003 | 7/1953 | Thompson et al. | 407/46 |
| 2,840,887 | 1/1958 | Donnelly | 407/41 |
| 3,018,675 | 1/1962 | Klages | |
| 3,540,103 | 11/1970 | Saari | 407/46 |
| 4,182,587 | 1/1980 | Striegl | 407/61 |

OTHER PUBLICATIONS

Industrieanzeiger (Industrial Reporter of Germany) 94, Jg. No. 42 of 1972, pp. 973–974.

Primary Examiner—Harrison L. Hinson
Attorney, Agent, or Firm—Becker & Becker, Inc.

[57] ABSTRACT

A cutter head, for high speed face-milling cutting, with cutting plates pressable by centrifugal force against recess walls of the cutter head body. The cutting plates are arranged in recesses, of the cutter head body, with walls directed radially outwardly toward each other and having a dovetailed cross section tapering toward the chip space, the cutting plates being respectively held by a clamping piece having an inclined surface which is located opposite the free surface of the cutting plates. The cutting plates, which may be multiply arranged in common radial planes, are identical and are disposed with their cutting edges in a common tangential plane. Adjacent cutting plates of one radial plane, and forming a row, may be axially longitudinally displaced relative to the cutting plates of a second or third radial plane.

11 Claims, 7 Drawing Figures

CUTTER HEAD FOR HIGH-SPEED MILLING

The present invention relates to a cutter head or end-milling cutter, for high speed face-milling cutting, with cutting plates pressable by centrifugal force against recess walls of the cutter head body.

Cutting or milling tools are known for cutting speeds up to 50 km/min. With these tools, the cutting plates are fitted lightly clamped into pockets in order at that location to be radially securely pressed by the centrifugal force of their own mass (Industrieanzeiger (Industrial Reporter), 94, Jg (year) No. 42, 1972, pages 973/74).

It is an object of the present invention to provide a tool which is simple in construction and utilization and can be used for high speed face-milling cutting; in particular, a tool which in spite of its simplicity permits rotational speeds of 50,000 to 60,000 $\min^{-1}$.

This object, and other objects and advantages of the present invention, will appear more clearly from the following specification in connection with the accompanying drawings, in which.

Figure 1:
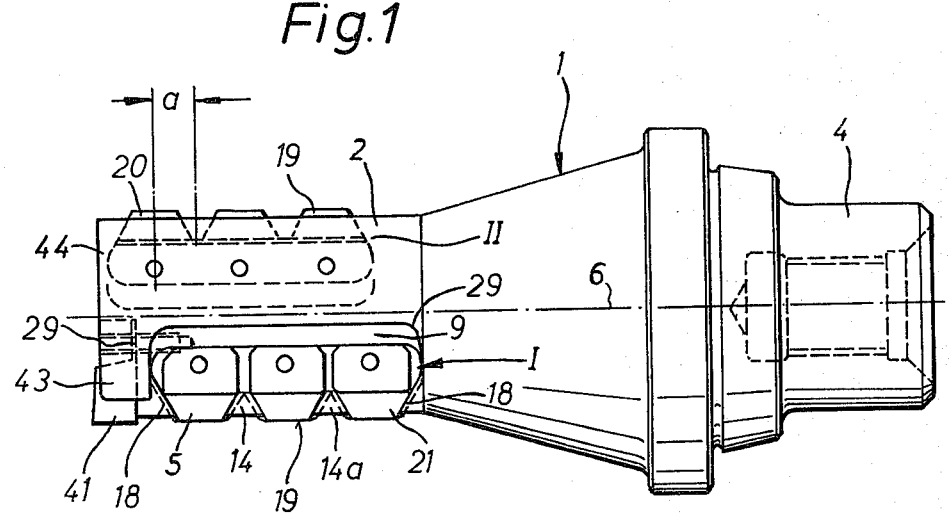
FIG. 1 is a side view of one embodiment of the inventive cutter head.

The cutter head of the present invention is characterized primarily in that the cutting plates are arranged in recesses, of the cutter head body, with walls directed radially outwardly toward each other and having a dovetailed cross section tapering toward the chip space, the cutting plates being respectively held by a clamping piece having an inclined surface which is located opposite the free surface of the cutting plates.

Further features and preferred embodiments of the present invention are described in the following paragraphs.

The cutting plates, which may be multiply arranged in common radial planes, may be identical and disposed with their cutting edges in a common tangential plane. Adjacent cutting plates of one radial plane, and forming a row, may be axially longitudinally displaced relative to the cutting plates of a second or third radial plane.

A chip space which is approximately rectangular in cross section may, when viewed in the rotational direction of the cutter head, extend before the tool row of one radial plane and may extend over all the cutting plates of this radial plane. The recess, which expands toward the support surface of the cutter head body, may spread radially inwardly and merge into the support surface of a groove extending axially over the entire length of all cutting plates of one radial plane.

The chip surfaces and the support surface of the cutting plates may extend parallel to the radial plane of the cutter head body, and the free surfaces as well as the inclined side surfaces may form an angle of 8° to 14° with at least one associated adjoining surface. The respective side surfaces of the cutting plates, and the walls of the recesses, may form an angle of 50° to 70°.

One lateral longitudinal edge of the rectangular clamping piece may be inclined, and the clamping piece may be provided with a hollow threaded pin or extension which projects into a cylindrical recess of the cutter head body. A screw having oppositely extending threads and disposed at right angles to the radial plane of the cutting plates may be screwable into the hollow threaded pin or extension and into a coaxial counter thread in the cutter head body.

A boundary or limiting wall which is common for all identical chip spaces of one radial plane may extend parallel to the middle or longitudinal axis of the cutter head body.

The cutting plates 5 of the radial planes may be identical, may have rhombic, hexagonal, or octagonal peripheries, and may be provided with an axially parallel cutting edge and an axially parallel inclined surface, as a rear surface, which is located across from the free surface.

U.S. Pat. No. 3,018,675—Klages et al, issued Jan. 30, 1962, discloses a boring bar with cutting plates arranged in several radial planes one of which is held in a triangular, outwardly tapering recess which has inclined side walls. This known boring bar is neither provided for high-speed cutting or milling nor is the cutting plate received by the triangular recess pressed, at high speed of the boring rod, against the bottom of the recess and hence rigidly against an unadjustable support or abutment. A secure clamping of the cutting plate occurs only always at right angles to the plane of the cutting plates.

The advantage of the cutter head of the present invention is apparent in that, on the one hand by means of the side walls of the outwardly tapering recess which expands toward the bottom, and on the other hand by means of the inclined surface of the clamping piece which is effective against the back surface (main section pressure support surface) of the cutting plate, it is possible to hold the cutting plate in position even when encountering very great centrifugal forces. In this connection, with increasing centrifugal force, the engagement pressure presses the cutting plate not only against the side walls of the recess of the cutting head body, but also against the support wall located in the radial plane of the cutter head body, which support wall forms the bottom of the recess. In so doing, not only do the engagement or pressing forces increase with increasing speed of the cutting head, but the cutting plate also receives an accurately defined seat in the cutting head body.

Figure 2:
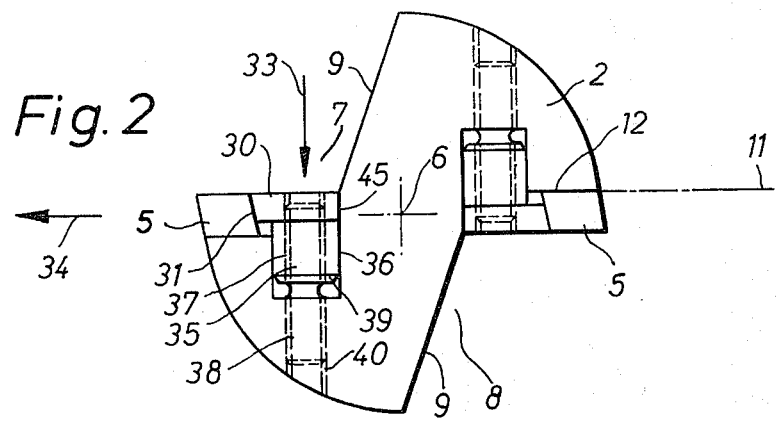
FIG. 2 is a cross section through that segment of the cutter head carrying the cutting plates.
Figure 3:
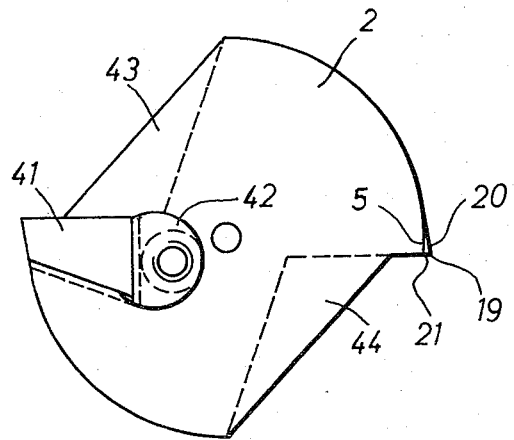
FIG. 3 is an end view of the cutter head.
Figure 4:
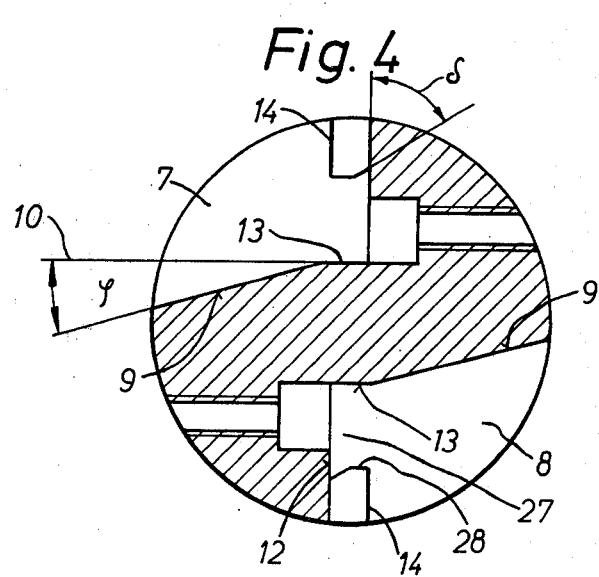
FIG. 4 is a cross section through the cutter head body.

Referring now to the drawings in detail, the cutter head according to the present invention has a cutter head body 1, the cylindrical shaft part 2 of which supports the cutting plates 5, and the conical segment 4 of which serves for receiving the cutting head on the cutting or milling machine. The cutter head body 1 in the illustrated example, as recognizable especially in FIGS. 2 and 4, is provided with two chip spaces 7,8 located diametrically opposite to each other in relation to the longitudinal axis 6 of the cutter head. The chip spaces are identical and are limited by a wall 9 which extends at an angle $p$ relative to a plane 10 which is directed parallel to the radial plane. The chip spaces 7,8 extend substantially over the length of the cylindrical tool-support part 2 and, as recognizable from FIG. 1, are displaced relative to each other in the longitudinal direction of the cutter head. The degree or extent of displacement corresponds to half the width of a cutting plate 5, or its clamping piece 30, which are described in greater detail in the following paragraphs. The displacement is designated by "a" in FIG. 1.

Figure 5:
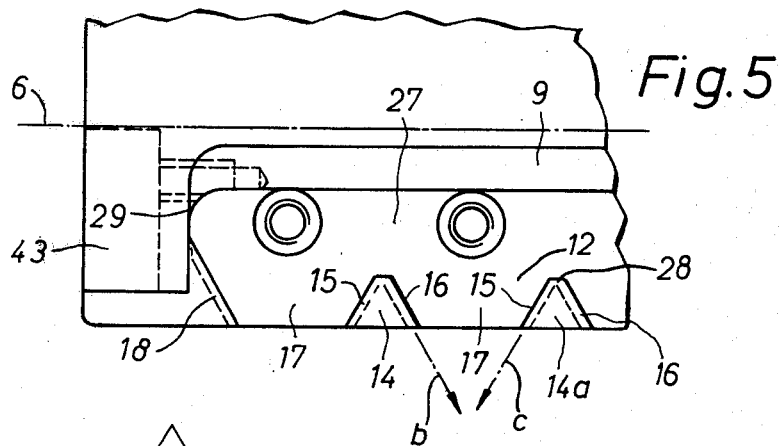
FIG. 5 is a partial side view of the cutter head body without cutting plates.
Figure 6:
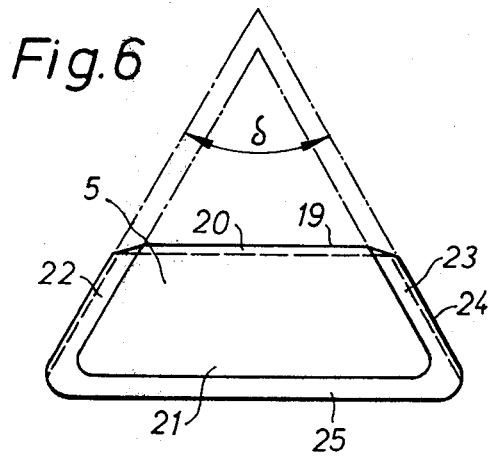
FIG. 6 is a plan view toward a cutting plate.
Figure 7:
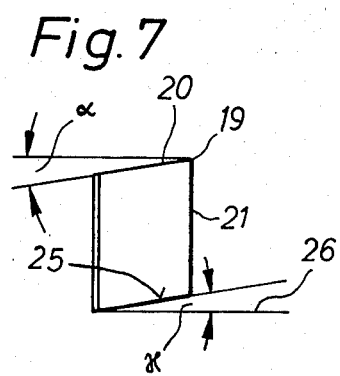
FIG. 7 is a side view of the cutter plate of FIG. 6.

The chip spaces 7 and 8 are identically limited by a support wall 12 representing a bottom and extending in a plane 11 likewise located parallel to the radial plane. The wall 9 of the chip space merges into a further wall 13 which is at right angles to the support wall 12. From the support wall 12 of the chip spaces 7,8 rise triangular support bodies 14, which are equally spaced from each other, and the side walls of which are inclined not only to each other both in the direction of the arrows b and c (FIG. 5), but are also inclined against the support wall 12. The two oppositely located triangular bodies 14 and 14a of FIG. 5 have a recess 17 therebetween, and the side walls 15, 16 thereof provide the recess 17 with a dovetailed cross section, which widens toward the bottom of the recess on the one hand and also tapers outwardly in the direction of the arrows b and c. Respectively, an identical recess 17 is formed between the triangular support body 14 and the side wall 18 which is located at the same level and likewise is inclined against the periphery of the shaft part 2 and extends at an incline to the support wall 12. Thus it is possible, as represented in FIG. 1, to install, for instance, three cutting plates at the same level next to each other in the recesses 17, and to hold these cutting plates in position by means of the side walls 15, 16, or 18. For this purpose, the cutting plates have a cutting edge 19 as well as the free surface 20 and the chip surface 21, which faces the observer in FIG. 6, and in FIG. 1 is represented with the cutting plates shown in solid lines. The side surfaces 15, 16, or 18 of the recesses 17, which are inclined in two directions, correspond to identical inclined surfaces 22, 23 of the cutting plate 5, that edge of which facing the support wall 12 can be interrupted at 24. The setting angle α according to FIG. 7 can be 8° to 14°; the same applies to the angle H between the advance or feed support surface 25 and the normal or vertical 26 to the chip surface 21. The angle δ between the surfaces 15, 16 on the one hand, and 15, 18 of the recesses 17 on the other hand, as well as between the side surfaces 22, 23 of the cutting plate 5, can be 50° to 70°.

The recesses 17 between the triangular support bodies 14, or between these and the wall 18, merge toward the wall 9 into a groove 27 (FIG. 4) which extends in the axial direction over the entire chip spaces 7,8 and is limited by a wall 13 as to the longitudinal axis 6 of the tool, while the front limit thereof is at the ends 28 of the triangular body 14. The lateral limitation of the groove 27 is provided by the ends 29 on both sides of the chip groove. In this groove 27, at the level of each cutting plate 5, there is provided a clamping piece 30 which is provided with an angled-off front side 31 which corresponds to the inclined surface 25 on the cutting plate 5. The incline of the inclined surfaces 25, 31 is selected in such a way that during tightening of the clamping piece 30 in the direction of the arrow 33 in FIG. 2, a pressure is exerted upon the cutting plate 5 in the direction of the arrow 34. Hence, the cutting plate 5, with its inclined surfaces 22, 23, can be pressed against the two-way inclined walls 15, 16 of the support body 14, or against the walls 18. When this pressure is exerted, the cutting plate is pressed on the one hand against the bottom 12 of the recess 17, and on the other hand receives such a snug engagement against the mentioned side walls that even when high centrifugal forces occur, an accurate seating of the cutting plate is guaranteed. A further advantage of the present inventive cutter head can be clearly recognized especially in FIG. 5, namely that the tools can be arranged very closely adjacent to each other, which means that the support bodies 14 can be made small since the forces exerted upon the side walls 15, 16 thereof cancel each other partially, and the side wall 18 only has to take up half of the return pressure force or reaction of a tool. Accordingly, relatively short slanted walls 15, 16 of the triangular support body 14 are sufficient.

The clamping pieces 30 have a cylindrical extension or hollow threaded pin 35 which projects into a corresponding cylindrical bore 36 of the cutter head body 1. The clamping piece 30 consequently receives radial support and guiding, so that the force exerted upon the cutting plate 5, as well as the occurring centrifugal force, is not taken up solely by the clamping piece screw or bolt 39, which is provided with oppositely extending threads 37, 38, and is capable of being screwed into the corresponding inner thread of the clamping piece 30, or the cylindrical extension 35 thereof, and into the oppositely extending inner thread 40 in the cutter head body.

At the level of the tool row designated by I, there is provided a front or end tool 41, which is held by a clamping piece 42 in a reinforced rib-like part 43. Since the two cutting plate rows I and II are displaced relative to each other by a distance "a", there results at the level of the cutting plate row II, on the end face of the cutter head, only a rib 44 narrower than the rib 43.

As recognizable in FIG. 2, the rear wall 45 of the clamping piece 30 can engage the wall 13 of the groove 27 which extends over the length of the chip space.

The present invention is, of course, in no way restricted to the specific disclosure of the specification and drawings, but also encompasses any modifications within the scope of the appended claims.

What we claim is:

1. A cutter head for high speed milling, comprising:
   a cutter head body having chip spaces and recesses bounded by recess walls, the recess walls of a respective recess being directed radially outwardly toward one another and having a dovetailed cross section tapering toward the associated chip space;
   cutting plates respectively arranged in said recesses and pressable by centrifugal force against associated recess walls, said cutting plates being respectively provided with a free surface; and
   clamping pieces connected to said cutter head body for respectively holding a cutting plate, each clamping piece having an inclined surface located opposite said free surface of the associated cutting plate.

2. A cutter head according to claim 1, in which each cutting plate has a cutting edge along one side of said free surface, and in which said cutting plates are multiply arranged in common radial planes, the cutting plates of a given plane being identical and having their respective cutting edges disposed in a common tangential plane.

3. A cutter head according to claim 2, in which adjacent cutting plates of a given radial plane form a row and are axially longitudinally displaced relative to the cutting plates of at least one other radial plane of cutting plates.

4. A cutter head according to claim 3, in which each chip space is approximately rectangular in cross section and, when viewed in the rotational direction of said cutter head, extends before the associated row of a given radial plane of cutting plates and over all of said cutting plates of said given radial plane.

5. A cutter head according to claim 4, in which said cutter head body is provided with a support surface, said recesses expanding toward said support surface, spreading radially inwardly, and merging into the support surface of a groove in said cutter head body, said groove extending axially over the entire length of all cutting plates of a given radial plane.

6. A cutter head according to claim 2, in which said respective cutting plates have two inclined side surfaces each having an edge common with said free surface, a chip surface having edges common with said side surfaces and an edge which coincides with said cutting edge and is common with said free surface, and a support surface, said chip surfaces and said support surfaces of said cutting plates extending parallel to the radial plane of said cutter head body, and said free surfaces and said inclined side surfaces forming an angle of 8°–14° with at least one associated adjoining surface.

7. A cutter head according to claim 6, in which the respective side surfaces of said cutting plates, as well as said recess walls, form an angle of 50°–70°.

8. A cutter head according to claim 7, in which said clamping piece is substantially rectangular, said inclined surface is one lateral edge of said clamping piece, said cutter head body includes a cylindrical recess, and said clamping piece is provided with a hollow threaded pin which projects into said cylindrical recess.

9. A cutter head according to claim 8, which includes a screw having oppositely extending threads and disposed at right angles to the radial plane of said cutting plates, said screw being screwable into said hollow threaded pin and into a coaxial counterthread in said cutter head body.

10. A cutter head according to claim 4, which includes a limiting wall which is common for all identical chip spaces of a given radial plane and extends parallel to the middle axis of said cutter head body.

11. A cutter head according to claim 2, in which said cutting plates of said radial planes are identical, have multi-sided peripheries, have an axial parallel cutting edge, and have an axially parallel inclined surface, as a rear surface, which is located across from said free surface.

* * * * *

UNITED STATES PATENT AND TRADEMARK OFFICE
CERTIFICATE OF CORRECTION

PATENT NO. : 4,335,983
DATED : 22 June 1982
INVENTOR(S) : Günter Wermeister et al It is certified that error appears in the above—identified patent and that said Letters Patent is hereby corrected as shown below:

On the Title-Abstract Page, please cancel:

(73) Assignee: Sandvik GmbH, Dusseldorf, Fed. Rep. of Germany and insert:

(73) Assignee: Santrade Ltd., Luzern, Switzerland

Signed and Sealed this

Twenty-first Day of September 1982

[SEAL]

Attest:

GERALD J. MOSSINGHOFF

Attesting Officer

Commissioner of Patents and Trademarks